Aug. 16, 1938.      C. W. LEGUILLON      2,126,965
COMPOSITE PAVING SLAB
Filed July 28, 1936
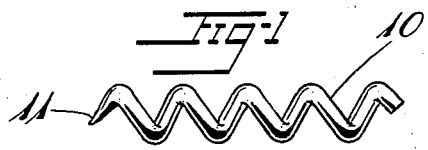
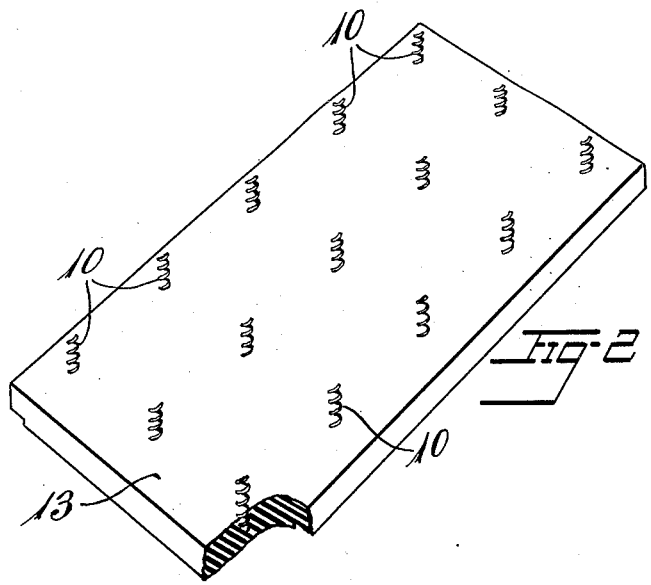
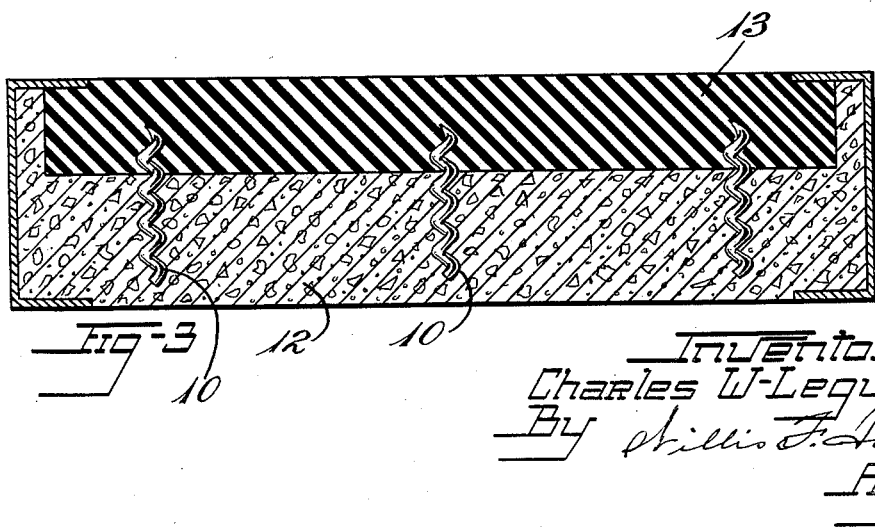
Inventor
Charles W. Leguillon
By Willis F. Ivery
Atty.

Patented Aug. 16, 1938

2,126,965

UNITED STATES PATENT OFFICE 2,126,965

COMPOSITE PAVING SLAB

Charles W. Leguillon, Akron, Ohio, assignor to The B. F. Goodrich Company, New York, N. Y., a corporation of New York Application July 28, 1936, Serial No. 92,992

3 Claims. (Cl. 94—15)

This invention relates to bonding elements for connecting masses of resilient material to masses of rigid material. The invention is especially useful where bodies of resilient rubber or similar plastic composition are to be attached to concrete or similar rigid materials.

The principal objects of the invention are to provide simplicity and flexibility of structure, and to facilitate placing of the bonding element.

Other objects will appear from the following description and the accompanying drawing.

Of the drawing:

Fig. 1 is a side elevation of the bonding element in its preferred form.

Fig. 2 is a perspective view of a slab of resilient plastic material having a plurality of such bonding elements partially embedded therein.

Fig. 3 is a sectional view of a paving block showing the use of the bonding elements to connect a slab of resilient plastic material to a rigid base.

Referring to the drawing, the bonding element 10 comprises a length of spring wire coiled to provide a helix and preferably formed with a sharp point 11 at one end thereof. One end of the helical bonding element may be embedded in a rigid concrete base 12 and the projecting ends of the bonding elements may be embedded in a resilient slab 13 of rubber composition or similar resilient material comprising the wear face of the paving element.

As the bonding element is resilient, that end thereof which is embedded in the resilient slab may yield when the slab is compressed or flows laterally under the pressure waves caused by the moving load of passing vehicles, thereby diminishing any tendency toward increased resistance to distortion of the resilient slab at the position of the bonds, and preventing the tearing of the slab from the bonding elements when subjected to distortion.

Due to the helical form of the bonding element, especially where it is provided with the sharpened end 11, the element may be forced into plastic material after the manner of inserting a cork-screw, and the helically curved form of the element provides an adequate extent of surface for resisting movement of the element with relation to adjacent portions of the material, so that tearing of the material or loosening of the element is not likely to occur.

I claim:

1. A composite paving slab comprising, in combination, a stiff backing, a surface layer of tough, resilient material comprising rubber composition, said material being resiliently yieldable under the pressure wave of a vehicle moving upon it, and anchoring members comprising helical convolutions of resilient metal embedded in the stiff backing at positions spaced apart in all directions and extending into the said surface layer, the portions of the anchoring members within the said surface layer being resiliently yieldable by virtue of their helical form and resiliency to maintain the anchorage despite flexure of material of the surface layer in any direction.

2. A composite paving slab comprising, in combination, a concrete backing, a surface layer of tough, resilient material comprising rubber composition, said material being resiliently yieldable under the pressure wave of a vehicle moving upon it, and anchoring members comprising helical convolutions of resilient wire screwed into said layer at positions spaced apart in all directions and embedded in the concrete, the portions of the anchoring members within said layer being resiliently yieldable by virtue of their helical form and resiliency to maintain the anchorage despite flexure of material of the surface layer in any direction.

3. A composite paving slab comprising, in combination, a stiff backing, a surface layer of tough, resilient material comprising rubber composition, said material being resiliently yieldable under the pressure wave of a vehicle moving upon it, and anchoring members embedded in the stiff backing at positions spaced apart in all directions and extending into the said surface layer, the portions of the anchoring members within the said surface layer being resiliently yieldable to maintain the anchorage by virtue of the resilience of the members and their spaced apart relation despite flexure of the material of the surface layer in any direction.

CHARLES W. LEGUILLON.